United States Patent [19]

Fleming

[11] 4,321,773
[45] Mar. 30, 1982

[54] ROTARY CHOPPING CYLINDER TYPE FORAGE HARVESTER HAVING MEANS FOR SHARPENING ITS SHEAR BAR

[75] Inventor: Phillip F. Fleming, West Bend, Wis.

[73] Assignee: Gehl Company, West Bend, Wis.

[21] Appl. No.: 163,984

[22] Filed: Jun. 30, 1980

[51] Int. Cl.³ .................... A01D 75/08; B24B 3/42; B24B 19/00
[52] U.S. Cl. ...................................... 51/249; 56/250
[58] Field of Search ............. 51/246, 247, 249, 56 R, 51/48 HE; 30/139; 56/250

[56] References Cited

U.S. PATENT DOCUMENTS

| | | | |
|---|---|---|---|
| 2,245,968 | 6/1941 | Erdman | 51/249 |
| 3,724,139 | 4/1973 | Leverenz | 51/249 |
| 3,863,403 | 2/1975 | Fleming | 51/249 |
| 4,055,309 | 10/1977 | Fleming | 83/349 |

Primary Examiner—Roscoe V. Parker
Attorney, Agent, or Firm—James E. Nilles

[57] ABSTRACT

A forage harvester for harvesting crops and reducing them to forage by means of a rotary chopping cylinder which has a plurality of blades around its periphery which cooperate with a shear bar carried on the frame of the harvester. A sharpening device is provided above the cylinder for sharpening the cylinder blades and brackets are also provided for mounting the shear bar when it is to be sharpened, above the cylinder so that the same sharpening device that is used to sharpen the blades of the cylinder can also be used to sharpen the shear bar. Bracket mounting structure is provided for the shear bar to ensure that it is sharpened at the proper angle.

5 Claims, 8 Drawing Figures

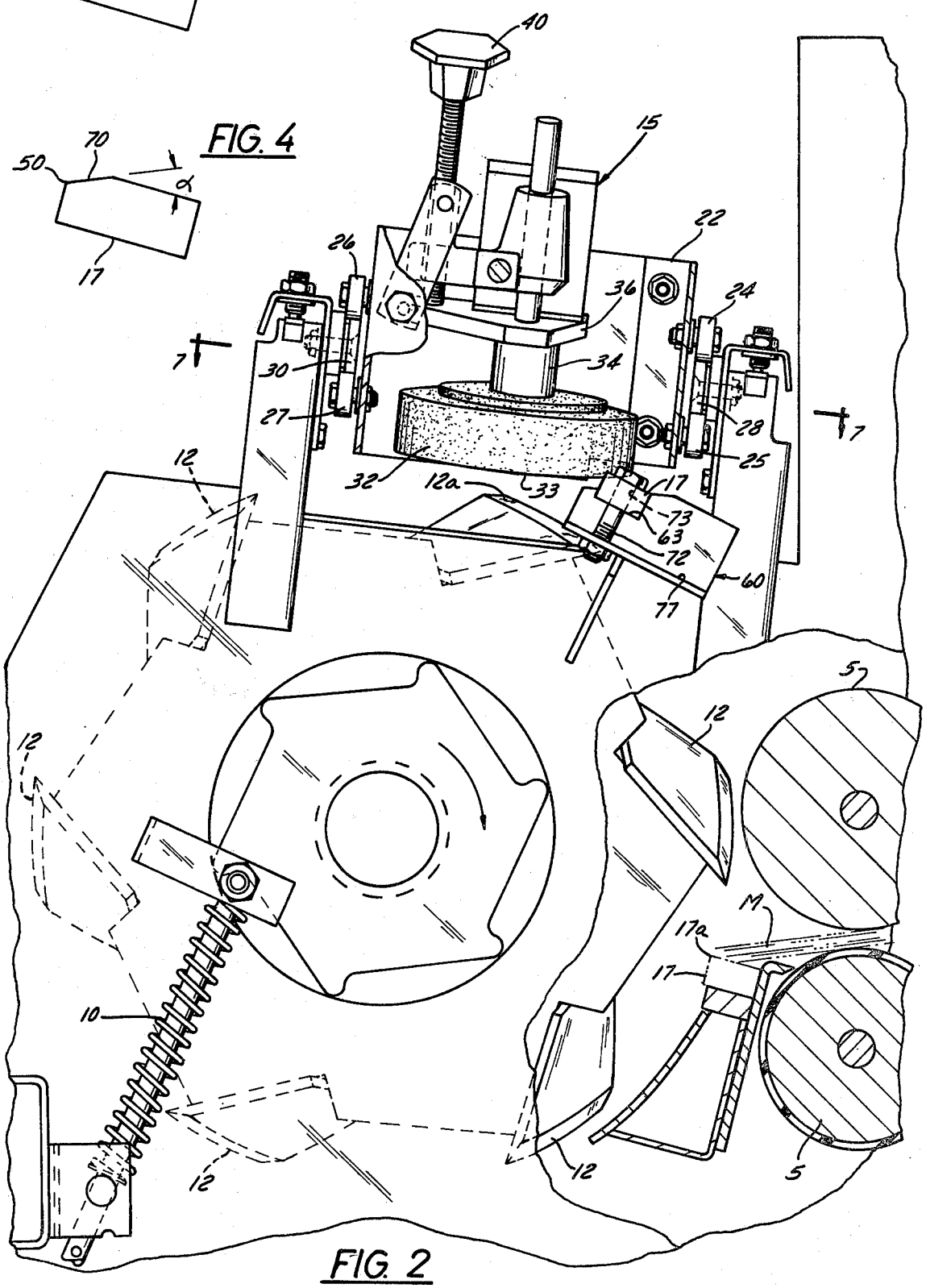

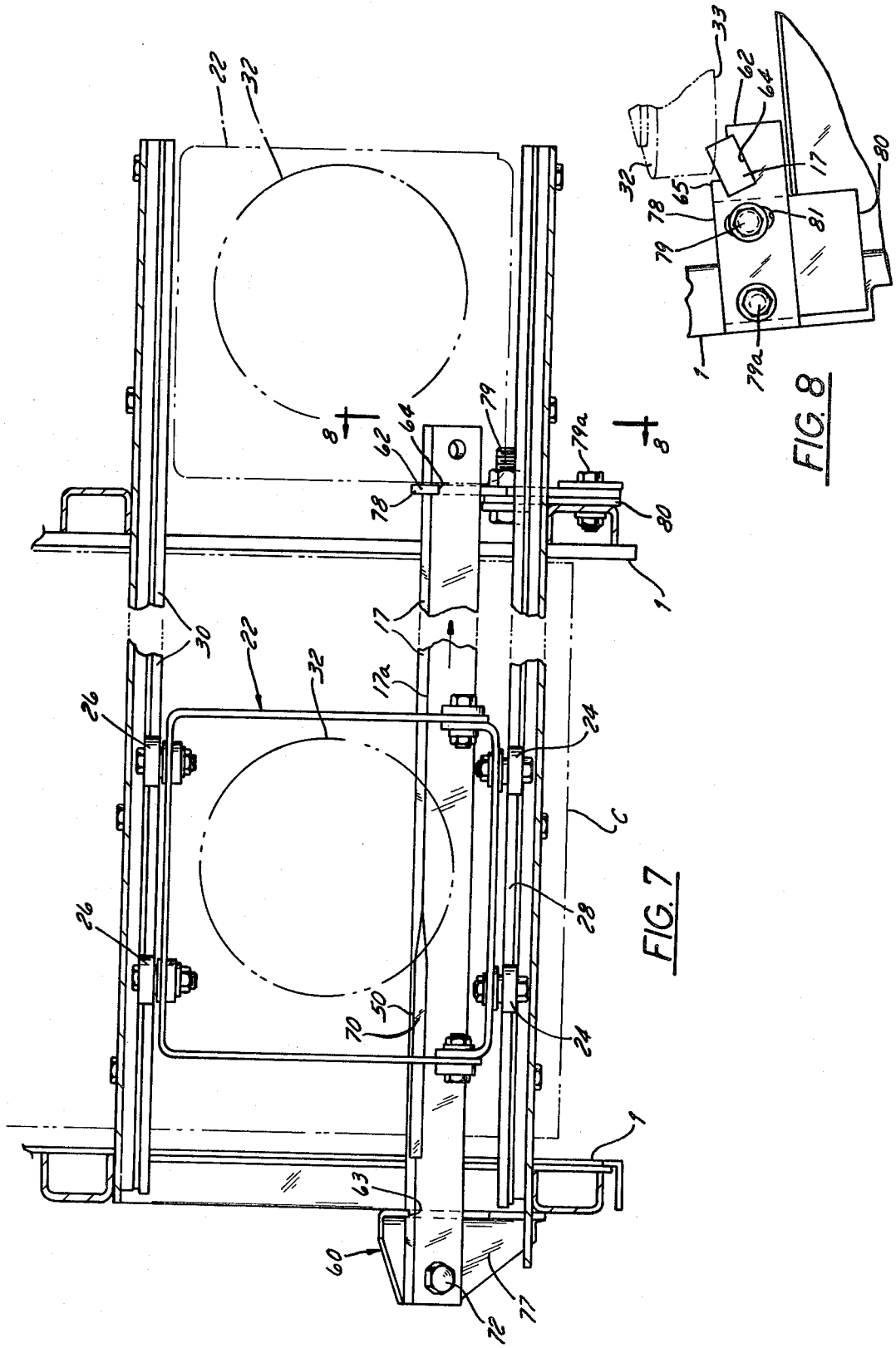

ROTARY CHOPPING CYLINDER TYPE FORAGE HARVESTER HAVING MEANS FOR SHARPENING ITS SHEAR BAR

BACKGROUND OF THE INVENTION

Forage harvester sharpening devices have been proposed for sharpening the blades of the rotary chopping cylinder and usually include a grinding wheel that is mounted on guide means above the chopping cylinder and which grinding wheel can be then guided for movement in an axial direction relative to the cylinder and at a proper disposition relative to the blade being sharpened. Each blade is successively presented to the grinding wheel for sharpening. Such an arrangement is shown in my U.S. Pat. No. 3,863,403 issued Feb. 4, 1975. Another type of sharpener is shown in U.S. Pat. No. 3,724,139 issued Apr. 3, 1973. Another prior art forage harvester of the type to which the present invention relates is shown in the U.S. Pat. No. 4,055,309 issued Oct. 25, 1977 and which shows the means for removably mounting the shear bar relative to the chopping cylinder. The present invention utilizes a mounting means for holding the shear bar in operative crop cutting position which is similar to that shown in the said U.S. Pat. No. 4,055,309.

The above three patents have been assigned to an assignee common with the present invention and in the device as shown in those patents, the shear bar must be removed for sharpening elsewhere, usually back at the workshop of the farmer-operator.

SUMMARY OF THE PRESENT INVENTION

The present invention provides a forage harvester of the rotary chopping cylinder type and which has a grinding wheel sharpening unit mounted above the chopping cylinder and which unit is accurately guided in a longitudinal direction over the top of the cylinder for sharpening the individual blades or knives of the chopping cylinder. More specifically, the invention relates to such a harvester in which mounting means are provided for mounting the shear bar in a sharpening position above the cylinder and whereby the same sharpening grinder wheel mechanism that is used to sharpen the blades of the cylinder can also be used to sharpen the shear bar at the proper angle. The mounting means provided by the present invention includes a pair of brackets rigidly mounted on the frame of the machine and which accurately and rigidly hold the shear bar in a proper attitude relative to the grinding wheel which can then be passed over the edge of the shear bar to be sharpened thereby ensuring sharpening the bar at the proper angle and to the proper degree, all without time-consuming and difficult set-up procedures. The arrangement is such that the shear bar can be removed from its conventional cutting position on the machine and placed in the mounting brackets on top of the cylinder and quickly secured therein. The cylinder blade chopping unit has a driven grinding wheel which is simply adjusted in the vertical direction so as to present the grinding face thereof at the proper attitude to the shear bar and for being moved along the shear bar in a sharpening pass. The shear bar of such a harvester wears at a particular angle due to the direction of the crop movement thereover and with the present invention it is necessary only to sharpen the bevelled wear surface of the shear bar to thereby properly sharpen the bar.

These and other objects and advantages of the present invention will appear hereinafter as this disclosure progresses, reference being had to the accompanying drawings.

BRIEF DESCRIPTION OF THE DRAWINGS

FIG. 2 is an enlarged, fragmentary view of a portion of the arrangement shown in FIG. 1, but in more detail, and showing certain parts in section, broken away or removed for the sake of clarity in the drawings, and also showing the cylinder knive and shear bar sharpening unit when raised to an elevated position for sharpening the shear bar;

FIG. 3 is an end view of a shear bar that has become worn in use;

FIG. 4 is a view similar to FIG. 3, but showing a properly sharpened shear bar;

FIG. 7 is a sectional view taken generally along the line 7—7 in FIG. 2 and showing the guide track means and the carriage for the sharpening unit;

FIG. 8 is a vertical, elevational view taken generally along the line 8—8 in FIG. 7 and showing the adjustable shear bar mounting bracket.

DESCRIPTION OF A PREFERRED EMBODIMENT

Figure 1:
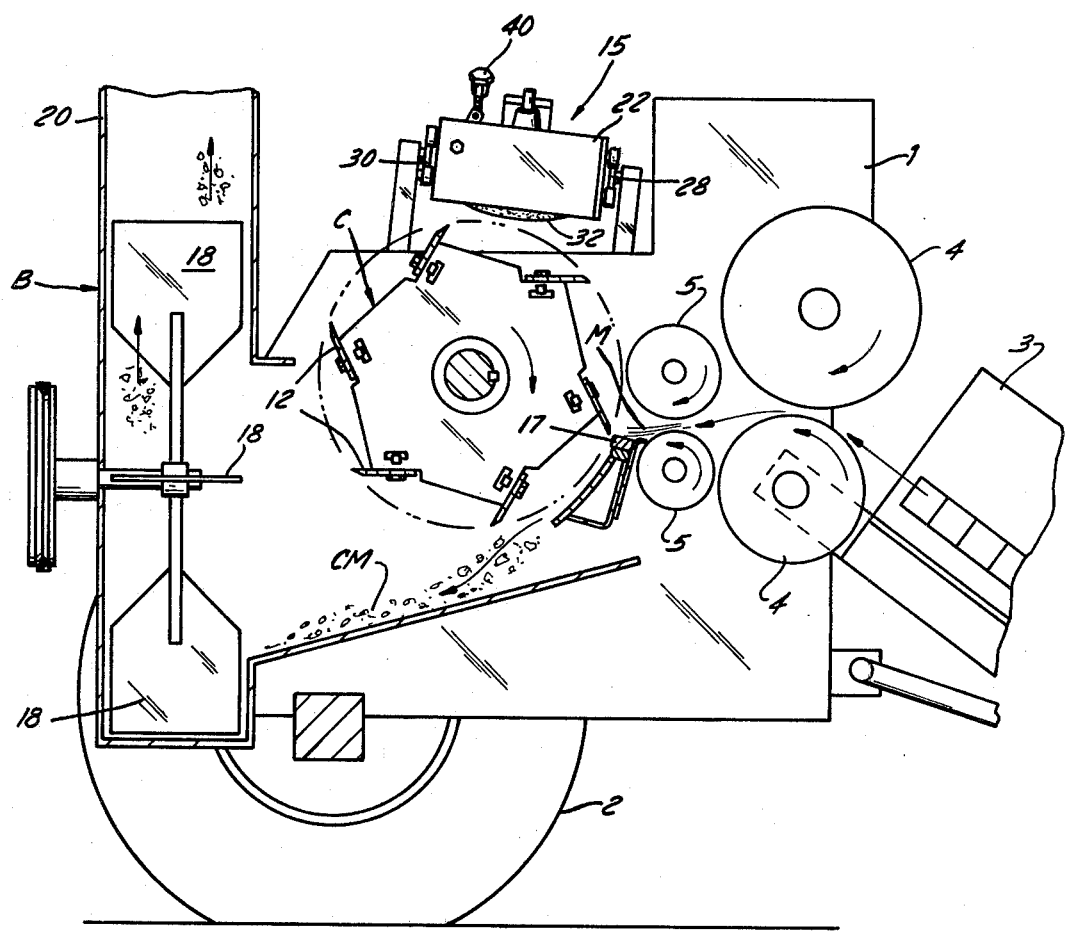
FIG. 1 is a vertical sectional view through a forage harvester, more or less schematic in form, and which embodies the present invention.

The general organization of the forage harvester with which the present invention is used is shown in FIG. 1 and includes a machine frame 1 carried by a pair of transversely spaced ground wheels 2 (only one shown) and having a forward crop gathering portion 3 which delivers the crop material from the ground and to a pair of feed rolls 4 and feed rolls 5, all of which rotate in the direction indicated by the curvilinear arrows to deliver the mass M of crop material to the chopping cylinder C.

Figure 5:
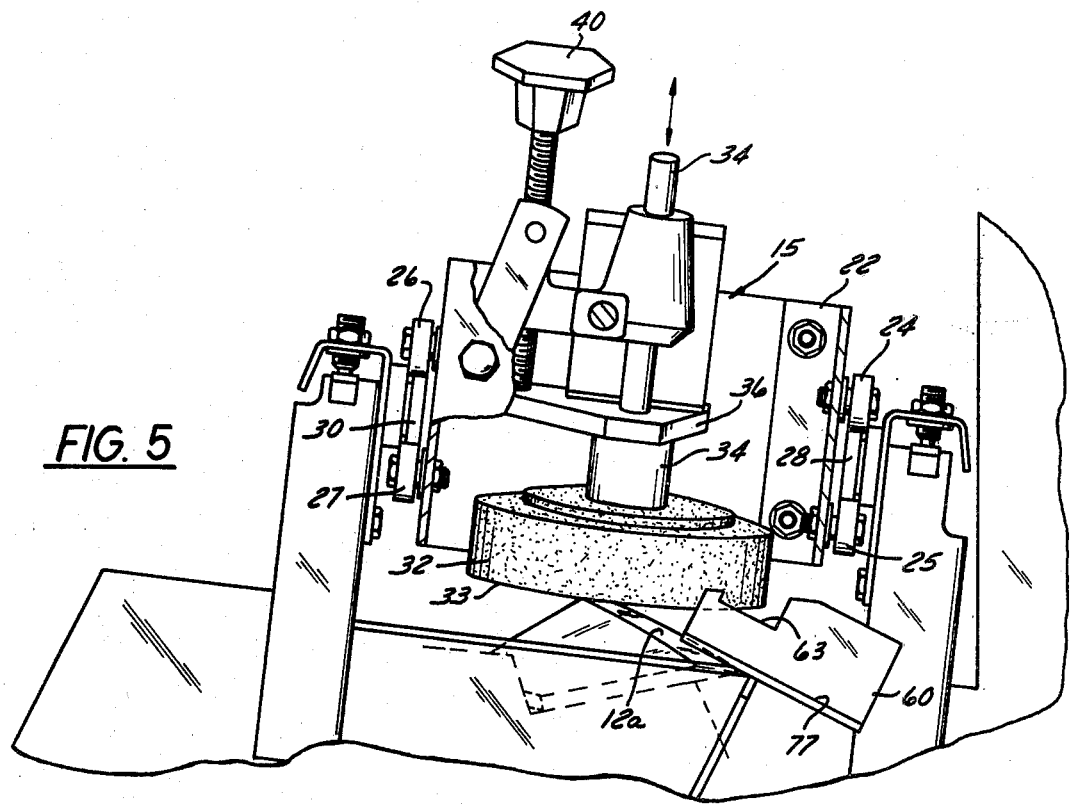
FIG. 5 is a view similar to a portion of FIG. 2, but showing the shear bar removed from its sharpening position and instead showing the grinding wheel when in the lowered position as to sharpen the knives of the cutting cylinder.

The chopping cylinder C is of conventional construction and may be of the type described in said U.S. Pat. No. 3,863,403. That patent also fully describes the spring loaded strut 10 which holds the cylinder, and more particularly each of its knives 12, in the proper position for being sharpened by the grinding wheel sharpening unit 15, as shown in FIG. 5.

As the material is chopped by the cooperative action between the knives 12 and the shear bar 17, that chopped material CM is then discharged rearwardly into conveying contact with the multi-paddle fan 18 that delivers the cut crop material through the discharge spout 20 of the conventional blower B, all in the known manner.

The grinding wheel sharpening unit 15 includes a carriage 22 mounted by its rollers 24 and 25 and rollers 26 and 27 located on opposite sides of the carriage and which pairs of rollers engage their respective guides 28 and 30 which are rigidly mounted on the frame of the machine. The carriage rotatably supports the driven grinding wheel 32 which has a lower flat surface 33 that contacts the bevelled surface 12a of the cylinder knives to thereby sharpen them. The grinding wheel 32 is rotatably supported by its shaft 34 which is carried by a vertically adjustable frame 36. The entire frame and consequently the wheel 32 can be vertically adjusted by the hand adjusting knob 40 in the known manner and as shown and described in the said U.S. Pat. No. 3,863,403. It is believed sufficient to say for purposes of this disclosure that the grinding wheel frame 36 can be vertically adjustable between a cylinder knife sharpening position as shown in FIG. 5 and the position shown in FIG. 2 where the wheel can sharpen a shear bar 17 when the latter is in the sharpening position as shown in FIG. 2 as will more fully appear.

Figure 6:
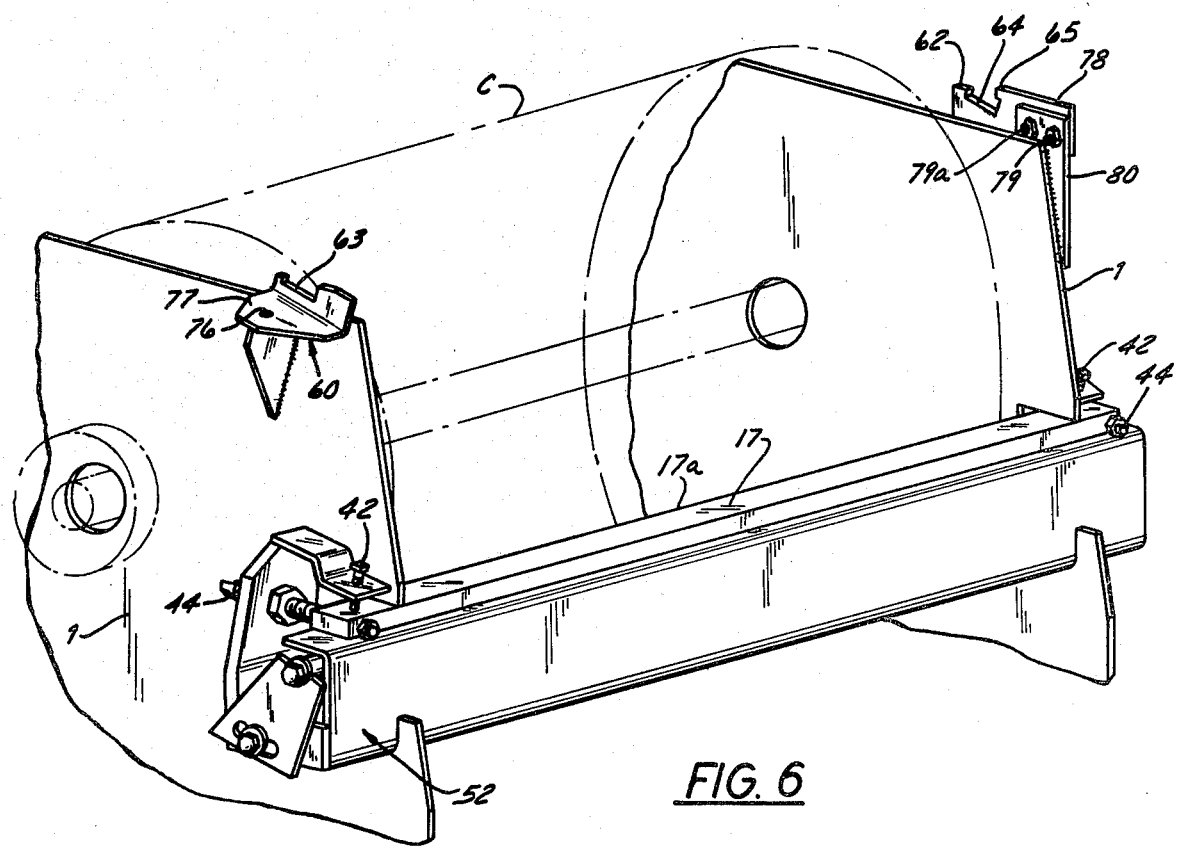
FIG. 6 is a fragmentary, perspective view of the shear bar when it is mounted on its mounting on the machine frame for a crop cutting operation, the cutting cylinder being indicated only diagrammatically by broken lines and the view showing the bracket mounting means located generally above the cylinder and for holding the shear bar when it is to be sharpened.

As shown in FIG. 2 the shear bar 17 is mounted in the crop cutting position and is rigidly held therein by the means shown clearly in FIG. 6 including the bolts 42 and the bolt means 44 located at opposite ends of the shear bar. As the layer of crop material M passes between the feed rolls 5 and over the upper corner 17a of the shear bar, the knives 12 of the cylinder swing past the cutting edge 17a and shear the crop material in the known manner. After some period of operation, the shear bar becomes worn on its cutting corner, as shown in FIG. 3 and assumes a rounded shape on that corner. When this occurs, proper cutting cannot occur and the shear bar must be sharpened at the proper angle shown in FIG. 4 which illustrates a properly sharpened shear bar. The angle α shown in FIG. 4 is the angle the crop material M assumes relative to the top of the shear bar, as shown in FIG. 2, as it passes over the top of the shear bar. This continual movement of the material M over the shear bar tends to wear the shear bar, and sharpening the shear bar as shown in FIG. 4 again presents a sharp cutting corner 50.

In order to sharpen the shear bar the procedure is as follows. The grinding wheel 32 is elevated (by turning knob 40) as shown in FIG. 2. Bar sharpening mounting outer bracket 60 and inner bracket 62 are rigidly attached to the frame 1 of the machine, and one on each side of the cylinder C. These brackets 60 and 62 are also located generally at the top of the frame and generally above the cylinder, the brackets being secured as by welding to the frame 1. The brackets 60 and 62 have shear bar seating recesses 63 and 64, respectively, into which the rectangular in cross section shear bar can be accurately and firmly seated. It will be noted that bracket 62 has an overhanging projection 65a above the recess 64 so that the end of the shear bar can be slipped into the recess in the general direction indicated by the arrow in FIG. 7 and is then held captive therein when the other end of the shear bar is bolted to bracket 60, by bolt means 72 as will appear. This permits easy insertion and removal of the shear bar from bracket 62 by the operator from the open or operator's side of the machine which is located adjacent the other bracket 60, whereas bracket 62 is located at the center, obstructed portion of the harvester.

The upwardly facing and generally U-shaped recesses 63 and 64 are also arranged at an angle so that the shear bar 17 assumes generally the same position when being sharpened as it does when it is in the crop cutting position. The bar 17 is removed from its mounting 52 (FIG. 6) by removing the bolts 42 and 44 and inserted in the brackets 60 and 62. The lower surface 33 of wheel 32 can pass over the corner of the shear bar to be sharpened and moves along the length of the shear bar to eventually form the inclined flat surface 70 (FIG. 4) on the shear bar.

In order to hold the shear bar securely in the brackets 60 and 62, bolt means 72 is inserted through hole 73 in the outer end of the shear bar and also through aligned hole 76 (FIG. 6) in the outwardly extending flange 77 of the bracket 60 and tightened in place.

After the shear bar has been sharpened due to an adequate number of passes of the grinder wheel over the length thereof, the shear bar can be easily and quickly removed from its mounting brackets 60 and 62 and returned to its crop cutting, normal operating position for cooperation with the cylinder blades.

When the sharpening unit is again to be used for sharpening the blades of a chopping cylinder, the inner bracket 62 would be in the way of the movement of the carriage at its innermost travel on the guide means as when the carriage is to be moved inwardly of the cylinder so that the grinding wheel can start a sharpening pass over the cylinder knife. Therefore, it is necessary that the inner bracket 62 be swung downwardly out of the way so that the carriage can pass inwardly on its guide tracks to begin its cylinder knife sharpening operation. For the purpose of making the inner bracket 62 pivotally mounted so that it can be swung out of the way, the inner bracket 62 includes an upper plate-like portion 78 which is fixed by bolts 79 to the lower bracket member 80 that in turn is welded to the frame 1. As shown in FIG. 8, the upper bracket member 78 has an arcuate slot 81 therein and through which the bolt means 79 passes so that the member 78 can be arcuately swung about the other bolt 79a.

With the present invention a convenient mounting means has been provided for accurately holding the shear bar above the chopping cylinder and which permits the same sharpening unit to be used for selective sharpening both the cylinder blades and the shear bar.

I claim:

1. In a forage harvester of the type having a rotary chopping cylinder including a plurality of knives mounted around its periphery and a shear bar mounted adjacent the path generated by said knives and at the forward side of said cylinder when said bar is in an operative cutting position to provide cooperative crop cutting action with said knives, a knife sharpening unit located on said harvester and above said knives and including a rotatably driven grinding wheel, carriage means for mounting said grinding wheel for axial movement along said cylinder and over each of the knives to be sharpened, shear bar mounting means on said harvester and located above said cylinder and adjacent the path of axial movement of said grinding wheel, said mounting means including means for accurately and rigidly holding said shear bar in said mounting means when said bar has been removed from said operative cutting position whereby said knife sharpening grinding wheel can be passed over said shear bar to sharpen the latter.

2. The harvester set forth in claim 1 further characterized in that said mounting means includes a pair of shear bar holding brackets secured to said harvester and generally above said cylinder and means for removably holding said shear bar in said brackets.

3. The harvester set forth in claim 2 further characterized in that said mounting brackets include upwardly facing and generally U-shaped recesses in which said bar is accurately and rigidly seated in a proper attitude relative to said grinding wheel.

4. A forage harvester comprising, a rotary chopping cylinder including a plurality of knives mounted around its periphery and a shear bar mounted adjacent the path generated by said knives to provide cooperative crop cutting action with said knives, a knife sharpening unit located on said harvester and above said knives and including a rotatably driven grinding wheel, carriage means for rotatably mounting said grinding wheel, guide means carried by said harvester for guiding said carriage and wheel for axial movement along said cylinder and over each of the knives to be sharpened, means for vertically positioning said wheel;

shear bar mounting means on said harvester and including shear bar holding brackets located generally above said cylinder, one adjacent each end of said cylinder for accurately and rigidly holding said shear bar whereby said knife sharpening grinding wheel can be passed over said shear bar to sharpen the latter, and releasable means for holding said shear bar in said brackets.

5. The harvester set forth in claim 4 further characterized in that said brackets define upwardly facing and generally U-shaped recesses in which said bar is accurately and rigidly seated in a proper attitude relative to said grinding wheel.

* * * * *